(12) United States Patent
Dusterhoft et al.

(10) Patent No.: US 10,711,564 B2
(45) Date of Patent: Jul. 14, 2020

(54) USE OF DEGRADABLE METAL ALLOY WASTE PARTICULATES IN WELL TREATMENT FLUIDS

(71) Applicant: Halliburton Energy Services, Inc., Houston, TX (US)

(72) Inventors: Ronald Glen Dusterhoft, Katy, TX (US); Michael Linley Fripp, Carrollton, TX (US); Philip D. Nguyen, Houston, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/332,262

(22) PCT Filed: Oct. 28, 2016

(86) PCT No.: PCT/US2016/059464
§ 371 (c)(1),
(2) Date: Mar. 11, 2019

(87) PCT Pub. No.: WO2018/080519
PCT Pub. Date: May 3, 2018

(65) Prior Publication Data
US 2019/0203101 A1    Jul. 4, 2019

(51) Int. Cl.
| | | |
|---|---|---|
| *E21B 33/13* | (2006.01) |
| *C09K 8/03* | (2006.01) |
| *C09K 8/80* | (2006.01) |
| *E21B 43/267* | (2006.01) |
| *C09K 8/62* | (2006.01) |
| *C09K 8/50* | (2006.01) |
| *C09K 8/56* | (2006.01) |
| *C09K 8/504* | (2006.01) |

(Continued)

(52) U.S. Cl.
CPC .............. *E21B 33/13* (2013.01); *C09K 8/032* (2013.01); *C09K 8/50* (2013.01); *C09K 8/5045* (2013.01); *C09K 8/56* (2013.01); *C09K 8/62* (2013.01); *C09K 8/665* (2013.01); *C09K 8/80* (2013.01); *E21B 43/267* (2013.01); *C09K 8/572* (2013.01)

(58) Field of Classification Search
None
See application file for complete search history.

(56) References Cited

U.S. PATENT DOCUMENTS

| | | |
|---|---|---|
| 6,971,448 B2 | 12/2005 | Slabaugh et al. |
| 7,036,587 B2 | 5/2006 | Munoz, Jr. et al. |

(Continued)

FOREIGN PATENT DOCUMENTS

WO    2015153397 A1    10/2015

OTHER PUBLICATIONS

Zhang, Zhihui et. al., Developing New-Generation Disintegrable Material to Improve Efficiency of Multistage Fracturing Treatment in Cased-Hole Completions, OTC-26829-MS, prepared for presentation at the Offshore Technology Conference Asia held in Kuala Lumpur, Malaysia, Mar. 22-25, 2016.

*Primary Examiner* — Andrew Sue-Ako
(74) *Attorney, Agent, or Firm* — McAfee & Taft

(57) ABSTRACT

A well treatment fluid is provided. The well treatment fluid comprises a base fluid, and a plurality of degradable metal alloy milling waste particulates. A method of treating a well using the well treatment fluid is also provided.

11 Claims, 2 Drawing Sheets

(51) Int. Cl.
*C09K 8/66* (2006.01)
*C09K 8/57* (2006.01)

(56) References Cited

U.S. PATENT DOCUMENTS

| | | |
|---|---|---|
| 7,096,947 B2 | 8/2006 | Todd et al. |
| 7,353,879 B2 | 4/2008 | Todd et al. |
| 7,661,481 B2 | 2/2010 | Todd et al. |
| 7,829,507 B2 | 11/2010 | Todd et al. |
| 8,528,633 B2 | 9/2013 | Agrawal et al. |
| 8,663,401 B2 | 3/2014 | Marya et al. |
| 8,770,261 B2 | 7/2014 | Marya |
| 9,109,429 B2 | 8/2015 | Xu et al. |
| 9,243,475 B2 | 1/2016 | Xu |
| 9,260,935 B2 | 2/2016 | Murphree et al. |
| 2008/0135242 A1* | 6/2008 | Lesko ................ C09K 8/665 166/268 |
| 2010/0209288 A1 | 8/2010 | Marya |
| 2010/0282468 A1 | 11/2010 | Willberg et al. |
| 2011/0135953 A1* | 6/2011 | Xu ........................ B22F 1/02 428/548 |
| 2011/0240293 A1 | 10/2011 | Lesko et al. |
| 2013/0341023 A1 | 12/2013 | Krumrine, III et al. |
| 2014/0060834 A1* | 3/2014 | Quintero ............. E21B 33/13 166/292 |
| 2014/0363692 A1 | 12/2014 | Marya et al. |
| 2015/0247382 A1 | 9/2015 | Murphree et al. |

\* cited by examiner

USE OF DEGRADABLE METAL ALLOY WASTE PARTICULATES IN WELL TREATMENT FLUIDS

BACKGROUND

Well treatment fluids are circulated through wellbores and pumped through wellbores into subterranean formations in a variety of different applications. Examples of well treatment fluids include drilling fluids and stimulation fluids. An example of a stimulation fluid is a fracturing fluid that is pumped through a wellbore into a subterranean formation penetrated by the wellbore to create or enhance one or more fractures in the formation in order to increase the conductivity of the formation and allow hydrocarbons to more easily flow from the formation to the wellbore.

Particulate material is used in well treatment fluids for various purposes. For example, particulates are often used as a fluid loss control agent to fill and seal pore spaces in a subterranean formation. As another example, particulates are often added to a well treatment fluid to divert the fluid toward a desired area within a formation. For example, it may be desirable to add a diverting agent toward the end of a treatment operation being carried out on a particular section of a formation in order to slow or stop the flow of further treatment fluid into that section, thereby diverting the treatment fluid to another area of the formation.

Particulates made of degradable material are especially useful in well treatment fluids because of the ease associated with their clean up. However, they can be problematic in that they are difficult to grind into the small sizes often necessary to prevent fluid loss and carry out other functions. For example, degradable particulate materials based on polylactic acid ("PLA") often require cryogenic grinding to achieve the small sizes needed to seal pore spaces and fractures. Also, degradable particulate materials formed of plastic or polymer materials may not have a mechanical strength sufficient for all applications.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

Figure 1:
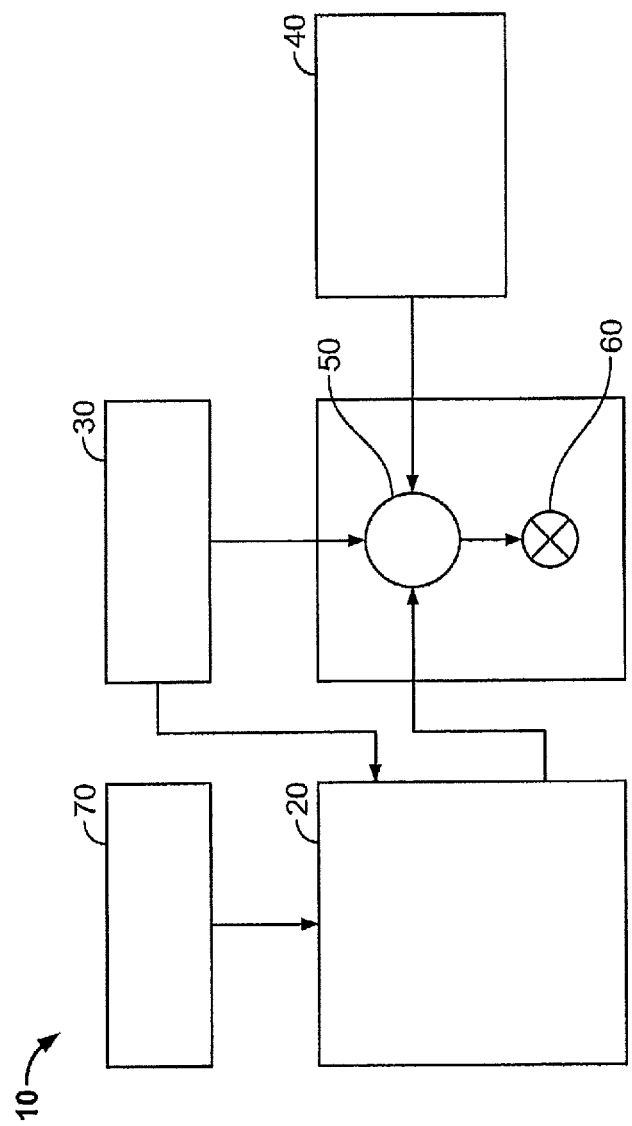
FIG. 1 is a diagram illustrating an example of a fracturing system that can be used in accordance with certain embodiments of the present disclosure.

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the disclosed subject matter. However, it will be understood by those of ordinary skill in the art that the subject matter described herein can be practiced without these specific details. In other instances, methods, procedures and components have not been described in detail so as not to obscure the related relevant feature being described. Also, the description is not to be considered as limiting the scope of the subject matter described herein. The drawings are not necessarily to scale and the proportions of certain parts may have been exaggerated to better illustrate details and features of the present disclosure.

In one aspect, the present disclosure is directed to a well treatment fluid. As used herein and the appended claims, a well treatment fluid means a fluid used to treat a wellbore and/or one or more subterranean formations penetrated by the wellbore. A wellbore means a hole that is bored in the ground for the purpose of forming a well to recover natural resources including oil, gas and/or water. The wellbore can be cased or uncased. For example, the well treatment fluid can be used as a drilling fluid, a diverting fluid or a fracturing fluid.

In another aspect, the present disclosure is directed to a method of treating a well. As used herein and in the appended claims, treating a well means treating a wellbore and/or a subterranean formation penetrated by the wellbore. For example, the method can be used to treat a wellbore during the process of drilling a well, and to hydraulically fracture a subterranean formation penetrated by the wellbore.

The Well Treatment Fluid

The well treatment fluid disclosed herein comprises a base fluid, and a plurality of degradable metal alloy milling waste particulates. The degradable metal alloy milling waste particulates are formed of a metal alloy that breaks down and at least partially deteriorates in a downhole environment. As used herein and in the appended claims, a plurality of degradable metal alloy milling waste particulates means a plurality of degradable metal alloy particulates derived by reducing the size of a plurality of degradable metal alloy milling waste particles. A plurality of degradable metal alloy milling waste particles means a plurality of degradable metal alloy shavings, pieces, portions, fragments, slivers, and/or scrap (collectively referred to as "shavings") formed as a byproduct resulting from milling, machining, molding, casting, forging, extruding, or otherwise transforming (collectively referred to as "milling") a degradable metal workpiece to obtain a degradable metal product having a desired shape.

As used herein and in the appended claims, a metal alloy means a mixture of at least one metal and at least one alloying element that have interacted together to form an alloy. For example, the metal can be a solid solution of metal elements (a single phase) or a mixture of metallic phases (two or more solutions). As used herein and in the appended claims, an alloying element means a metallic or non-metallic element that interacts with a metal to form a metal alloy. The metal alloy can have minor variations in the concentration of the alloying element due to intragrannular or intergranular inclusions.

As used herein and in the appended claims, a degradable metal alloy or other material means a metal alloy or material that is degradable due to one or both of the two relatively extreme cases of hydrolytic degradation that the degradable material may undergo (i.e., heterogeneous (or bulk erosion) and homogeneous (or surface erosion)) and any stage of degradation in between these two. In some instances, the term "degradation" refers to the conversion of materials into smaller components, intermediates, or end products by the result of solubilization, hydrolytic degradation, chemical reactions, thermal reactions, or any other suitable mechanism.

For example, the degradable metal alloy milling waste particulates can be formed of a metal alloy that breaks down and at least partially deteriorates in less than 20 days in a downhole environment. For example, the degradable metal alloy milling waste particulates can be formed of a metal alloy that breaks down and at least partially deteriorates in less than 15 days in a downhole environment. For example, the degradable metal alloy milling waste particulates can be formed of a metal alloy that breaks down and at least partially deteriorates in less than 10 days in a downhole environment. For example, the degradable metal alloy milling waste particulates can be formed of a metal alloy that breaks down and at least partially deteriorates in less than 5 days in a downhole environment. For example, the degradable metal alloy milling waste particulates can be formed of a metal alloy that breaks down and at least partially deteriorates in less than 2 days in a downhole environment. As used herein and in the appended claims, a downhole environment means an environment that is at least 2000 feet below the surface in a wellbore or subterranean formation penetrated by the wellbore in which the temperature is at least 120° F. and the pressure is at least 1000 psi.

In recent years, degradable metal alloys have been used in milling operations to form various downhole tools and other components such as frac balls, packer plugs and other wellbore components (collectively referred to as "wellbore components") that are ultimately allowed to deteriorate or dissolve in a wellbore fluid under downhole conditions. The dissolved materials simply flow back with the production fluids, making time consuming and costly removal of the wellbore components unnecessary.

It has now been discovered that the degradable metal alloy milling waste particles formed in milling wellbore components and derived from other sources can be efficiently and effectively used as degradable metal alloy milling waste particles used in connection with the well treatment fluid disclosed herein. For example, the degradable metal alloy milling waste particles can be easily ground into small particulates and have a sufficient mechanical strength for use in connection with oil and gas well operations. Accordingly, for example, the plurality of degradable metal alloy milling waste particles can be a plurality of degradable metal alloy shavings formed as a byproduct resulting from milling or machining a degradable metal work piece to obtain a degradable metal wellbore component or other type of component having a desired shape. The waste stream from the degradable metal alloy wellbore component or other component milling process is put to efficient use. As used herein and in the appended claims, a wellbore component means a downhole tool, frac balls, packer plug, tool component, plug, device or other structure that is used in connection with an operation carried out on a wellbore or a formation penetrated by the wellbore.

The base fluid of the well treatment fluid can be a non-aqueous base fluid or an aqueous base fluid. The non-aqueous base fluid or aqueous base fluid can include a water-in-oil emulsion, an oil-in-water emulsion, or an aqueous-miscible fluid.

For example, the base fluid can be a non-aqueous base fluid. For example, the non-aqueous base fluid can be selected from the group of alkanes, olefins, aromatic organic compounds, cyclic alkanes, paraffins, diesel fluids, mineral oils, desulfurized hydrogenated kerosene, and any combination thereof.

In most applications, the well treatment fluid in general and the base fluid of the well treatment fluid are aqueous-based. For example, the base fluid can be water. The water can come from a variety of sources. For example, the water can be fresh water, saltwater (for example, water containing one or more salts dissolved therein), brine (for example, saturated saltwater or produced water), seawater, brackish water, produced water (for example, water produced from a subterranean formation), formation water, treated flowback water, and mixtures thereof. Generally, the water can be from any source, provided that it does not contain components that might adversely affect the stability and/or performance of the well treatment fluid.

Suitable aqueous-miscible fluids for use in connection with the base fluid of the well treatment fluid include alcohols such as methanol, ethanol, n-propanol, isopropanol, n-butanol, sec-butanol, isobutanol, and t-butanol; glycerins; glycols such as polyglycols, propylene glycol, and ethylene glycol; polyglycol amines; polyols; combinations of such compounds with salts such as sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; and combinations thereof.

Suitable water-in-oil emulsions, also known as invert emulsions, for use in connection with the base fluid of the well treatment fluid may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base carrier fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

For example, the degradable metal alloy milling waste particulates can comprise at least one reactive metal, and at least one alloying element. As used herein and in the appended claims, a reactive metal means a metal that can react with a wellbore fluid in order to produce a metal oxide or a metal hydroxide. The reactive metal is alloyed with the alloying element to form a reactive metal alloy. The alloying element(s) can enhance or diminish the reactive behavior of the reactive metal. As a result, for example, the degradable metal alloy milling waste particulates used in the well treatment fluid disclosed herein can be selected based on the alloying element(s) used to form the metal alloy(s) forming the particulates if desired.

For example, the reactive metal(s) of the degradable metal alloy milling waste particulates can be selected from the metals listed in columns I and II of the Periodic Table of the Elements and aluminum. By way of further example, the reactive element can be selected from the group of calcium, magnesium and aluminum. As used herein and in the appended claims, the Periodic Table of the Elements means the Periodic Table of the Elements as published by the Los Alamos National Laboratory Chemistry Division in 2011.

For example, the alloying element(s) of the degradable metal alloy milling waste particulates can be selected from the group of aluminum, bismuth, calcium, cobalt, iron, copper, gallium, indium, lithium, magnesium, nickel, mercury, carbon, silicon, titanium, zirconium and any combination thereof. For example, the alloying element(s) of the degradable metal alloy milling waste particulates can be selected from the group of bismuth, calcium, cobalt, iron, copper, gallium, indium, lithium, magnesium, nickel, mercury, carbon, silicon, titanium, zirconium and combinations thereof.

For example, the degradable metal alloy milling waste particulates of the well treatment fluid can have a spheroidal shape with a D50 particle size distribution in the range of from about 0.1 microns to about 10,000 microns and a maximum dimension to minimum dimension mean aspect ratio, for example, of 1:1 to 2:1. For example, the degradable metal alloy milling waste particulates of the well treatment fluid can have a spheroidal shape with a D50 particle size distribution in the range of from about 0.1 microns to about 5,000 microns and a maximum dimension to minimum dimension mean aspect ratio, for example, of 1:1 to 2:1. For example, the degradable metal alloy milling waste particulates of the well treatment fluid can have a spheroidal shape with a D50 particle size distribution in the range of from about 0.1 microns to about 2,000 microns and a maximum dimension to minimum dimension mean aspect ratio, for example, of 1:1 to 2:1. For example, the degradable metal alloy milling waste particulates of the well treatment fluid can have a spheroidal shape with a D50 particle size distribution in the range of from about 1 micron to about 500 microns and a maximum dimension to minimum dimension mean aspect ratio, for example, of 1:1 to 2:1. For example, the degradable metal alloy milling waste particulates of the well treatment fluid can have a spheroidal shape with a D50 particle size distribution in the range of from about 10 microns to about 100 microns and a maximum dimension to minimum dimension mean aspect ratio, for example, of 1:1 to 2:1. As used herein and in the appended claims, the "D50 particle size distribution" of a particle or particulate means the value of the particle diameter at 50% in the cumulative distribution.

For example, the degradable metal alloy milling waste particulates of the well treatment fluid can be elongated particulates having the shape of, for example, ribbons, plates, oblate spheroids or acicular elements. For example, when the degradable metal alloy milling waste particulates are elongated particulates, they can have a mean thickness in the range of from about 0.1 microns to about 100 microns, and a length to thickness mean aspect ratio of 1:1 to 10,000:1. For example, when the degradable metal alloy milling waste particulates are elongated particulates, they can have a mean thickness in the range of from about 0.1 microns to about 100 microns, and a length to thickness mean aspect ratio of 50:1 to 1000:1. For example, when the degradable metal alloy milling waste particulates are elongated particulates, they can have a mean thickness in the range of from about 0.1 microns to about 100 microns, and a length to thickness mean aspect ratio of 50:1 to 100:1. For example, when the degradable metal alloy milling waste particulates are elongated particulates, they can have a mean thickness in the range of from about 0.1 microns to about 100 microns, and a length to thickness mean aspect ratio of 5:1 to 50:1. For example, when the degradable metal alloy milling waste particulates are elongated particulates, they can have a mean thickness in the range of from about 0.1 microns to about 100 microns, and a length to thickness mean aspect ratio of 1:1 to 20:1.

As used herein and in the appended claims, the "mean" thickness of the particulates means the average thickness of the particulates. Similarly, the "mean" aspect ratio of the particulates means the average aspect ratio of the particulates. The maximum dimension to minimum dimension aspect ratio of a spheroidal-shaped particulate means the ratio of the particulate's maximum dimension to its minimum dimension. The "length to thickness aspect ratio" of an elongated particulate means the ratio of the particulate's length to its thickness.

The degradable metal alloy milling waste particulates of the well treatment fluid can function in many ways. For example, the degradable metal alloy milling waste particulates can be added to a well treatment fluid and used as a fluid loss control agent to fill and seal pore spaces and openings to factures in a subterranean formation. As another example, the degradable metal alloy milling waste particulates can be added to a well treatment fluid and used to divert the fluid toward a desired area within a formation. For example, the degradable metal alloy milling waste particulates can be added to a well treatment fluid being used to treat a particular section of a formation in order to slow or stop the flow of further treatment fluid into that section and divert the treatment fluid to another section of the formation.

For example, because the degradable metal alloy milling waste particulates of the well treatment fluid are degradable, they can be used to temporarily seal openings in a wellbore or formation and to seal openings in a sand control filter or in a gravel pack. The sealing function can be a complete blocking of flow or it can be a flow restriction. For example, the degradable metal alloy milling waste particulates of the well treatment fluid can be flexible or pliable enough to allow the particulates to deform and form a tight seal, yet rigid enough to allow the particulates to withstand fluid pressure and effectively control fluid leakoff.

Additional Components

For example, the well treatment fluid disclosed herein can also comprise a plurality of additional degradable particulates if desired. For example, the additional degradable particulates break down and at least partially deteriorate in less than 20 days in a downhole environment. For example, the additional degradable particulates break down and at least partially deteriorate in less than 15 days in a downhole environment. For example, the additional degradable particulates break down and at least partially deteriorate in less than 10 days in a downhole environment. For example, the additional degradable particulates break down and at least partially deteriorate in less than 5 days in a downhole environment. For example, the additional degradable particulates break down and at least partially deteriorate in less than 2 days in a downhole environment.

For example, the additional degradable particulates can have a D50 particle size distribution in the range of from about 0.1 microns to about 2,000 microns. For example, the additional degradable particulates can have a D50 particle size distribution in the range of from about 1 micron to about 500 microns. For example, the additional degradable particulates can have a D50 particle size distribution in the range of from about 10 microns to about 100 microns.

For example, the additional degradable particulates can be formed of a degradable synthetic or polymeric material selected from the group of polysaccharides, lignosulfonates, chitins, chitosans, proteins, proteinous materials, fatty alcohols, fatty esters, fatty acid salts, aliphatic polyesters, poly(lactides), poly(glycolides), poly(e-caprolactones), polyoxymethylene, polyurethanes, poly(hydroxybutyrates), poly(anhydrides), aliphatic polycarbonates, polyvinyl polymers, acrylic-based polymers, poly(amino acids), poly(aspartic acid), poly(alkylene oxides), poly(ethylene oxides), polyphosphazenes, poly(orthoesters), poly(hydroxy ester ethers), polyether esters, polyester amides, polyamides, polyhydroxyalkanoates, polyethylene terephthalates, polybutylene terephthalates, polyethylene naphthalates, copolymers, blends, and derivatives of the above compounds and any combination thereof. For example, the additional degradable particulates can be formed of a degradable synthetic or polymeric material selected from the group of polyvinyl alcohol, substituted or unsubstituted lactides and glycolides, polylactic acid (PLA), polyglycolic acid (PGA), copolymers of PLA and PGA, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and any combination thereof.

As another example, the additional degradable particulates can be degradable, deformable polymer particulates. As used herein and in the appended claims, a deformable polymer particulate means a polymer particulate that deforms to enhance sealing voids between particulates and to provide adhesion between grains. Examples of degradable, deformable polymer particulates that can be used include particulates formed of one or more materials selected from the group of polystyrene, methyl methacrylate, nylon, polycarbonates, polyethylene, polypropylene, polyvinylchloride, polyacrylonitrile-butadiene-styrene, polyurethane, cellulose acetate butyral, polystyrene acrylonitride, polytetrafluoroethylene, diglycol allyl carbonates, epoxy resins, polyester, furan, phenol formaldehyde, phenolic epoxy, urea aldehydes, silicones, acrylics, vinyl acetates, casein, and natural and synthetic rubbers, The degradable, deformable polymer particulates function to deform and to enhance sealing voids between particulates and to provide adhesion between grains.

For example, the well treatment fluid disclosed herein can also comprise a plurality of non-degradable particulates. As used herein and in the appended claims, a non-degradable particulate means a particulate that does not break down or deteriorate in less than 365 days in a downhole environment.

For example, the non-degradable particulates can be non-degradable high crush-resistant particulates. For example, the non-degradable high crush-resistant particulates can have a crush strength of at least about 2000 psi. As used herein and in the appended claims, the crush strength of a particulate means the extent to which the particulate can withstand impact by a fluid or material without breaking or being crushed. For example, the non-degradable high crush-resistant particulates can have a crush strength in the range of from about 2000 psi to about 12,000 psi. For example, the non-degradable high crush-resistant particulates can have a crush strength in the range of from about 6,000 psi to about 12,000 psi.

For example, the non-degradable high crush-resistant particulates can have a D50 particle size distribution in the range of from about 0.1 microns to about 2,000 microns. For example, the non-degradable high crush-resistant particulates can have a D50 particle size distribution in the range of from about 1 micron to about 500 microns. For example, the non-degradable high crush-resistant particulates can have a D50 particle size distribution in the range of from about 10 microns to about 100 microns.

Examples of non-degradable high crush-resistant particulates that can be used include sand (including natural sand), gravel (including naturally occurring rock), fly ash, polymer particles, sintered material particles, ceramic particles, and glass particles. For example, the non-degradable high crush-resistant particulates used in the well treatment fluid disclosed herein can be selected from the group of natural sand, fly ash, ceramic particles and polymer particles. The non-degradable high crush-resistant particulates act as a filler and help the degradable metal alloy milling waste particulates withstand high fluid pressure.

For example, the non-degradable particulates can be non-degradable proppant particulates. As used herein and in the appended claims, a non-degradable proppant particulate means a non-degradable particulate that can be used to prop open a created or natural fracture in a subterranean formation.

As used herein and in the appended claims, unless stated otherwise, the term fracture includes and encompasses primary fractures and microfractures. The term primary fracture means a fracture that extends from the wellbore and is of a size sufficient to allow primary proppant particulates to be placed therein. The term microfracture means a fracture that extends from a primary fracture or a primary fracture branch and is not of a size sufficient to allow primary proppant particulates to be placed therein. For example, pumping a treatment fluid into the formation at a pressure above the fracture gradient of the formation can form a fracture network in the formation that includes at least one primary fracture and at least one microfracture. Microfractures can exist and be formed in both near-wellbore and far-field regions of the zone. As a result, the microfractures can give more depth and breadth to the fracture network resulting in increased production of hydrocarbons when the well is produced.

For example, the non-degradable proppant particulates can be non-degradable primary proppant particulates and/or non-degradable micro-proppant particulates. As used herein and in the appended claims, the term primary proppant particulate means a proppant particulate having a D50 particle size distribution of equal to or greater than 100 microns. The term micro-proppant particulate means a particulate having a D50 particle size distribution of less than 100 microns.

For example, the non-degradable primary proppant particulates of the well treatment fluid disclosed herein can have a D50 particle size distribution in the range of from about 100 microns to about 1200 microns. The non-degradable micro-proppant particulates have a size sufficient to allow the particulates to be placed in a microfracture. For example, the non-degradable micro-proppant particulates can have a D50 particle size distribution in the range of from about 1 micron to about 99 microns.

The non-degradable primary proppant particulates can be any type of non-degradable proppant particulate suitable for use in propping open a primary fracture, including conventional proppant particulates as known to those skilled in the art. Examples of non-degradable primary proppant particulates that can be used include sand, walnut hulls, resin pre-coated proppant particulates, man-made proppant particulates, and mixtures thereof. For example, the non-degradable primary proppant particulates can be natural sand. The non-degradable high crush resistant particulates discussed above can also be used.

The non-degradable micro-proppant particulates can be any type of non-degradable micro-proppant particulates suitable for use in propping open a microfracture. For example, the types of non-degradable proppant particulates used as primary proppant particulates and set forth above can be used as non-degradable micro-proppant particulates. Examples of micro-proppant particulates that can be used include sand (for example natural sand), bauxite, ceramic proppant materials, glass materials, polymer materials, polytetrafluoroethylene materials, fly ash, silica flour, seed shell pieces, fruit pit pieces, composite particulates including wood composite particulates, nut shell pieces including walnut hulls (for example, ground walnut hulls), resin pre-coated proppant particulates such as resin pre-coated sand, man-made non-degradable proppant particulates, and mixtures thereof.

Additional additives and components that can be included in the well treatment fluid disclosed herein include, but are not limited to, hydrocarbon fluids, air, salts, weighting agents, inert solids, fluid loss control agents, emulsifiers, dispersion aids, corrosion inhibitors, emulsion thinners, emulsion thickeners, additional viscosifying agents, surfactants, lost circulation materials, pH control additives, breakers, biocides, stabilizers, chelating agents, scale inhibitors, mutual solvents, oxidizers, reducers, clay stabilizing agents, hydrolyzable acid generators, delayed acid generators, filter cake breakers, organic acids, inorganic acids, and any combination thereof. For example, it may be advantageous to include a clay stabilizing agent in the well treatment fluid in order to minimize clay swelling. As another example, it may be advantageous to include one or more other additives from the above list in the well treatment fluid to accelerate the degradation of the degradable metal alloy milling waste particulates. For example, a delayed acid generator can produce formic acid after 4 to 16 hours at downhole temperatures. The time delay in the delayed acid generation allows the degradable metal alloy milling waste particulates more time to seal the flow. Degradation of the degraded metal alloy is accelerated once the acid is generated.

The Method of Treating a Well

The method of treating a well provided herein comprises: providing a well treatment fluid; introducing the well treatment fluid into the well and allowing the well treatment fluid to treat the well; and allowing the degradable metal alloy milling waste particulates to degrade. The well treatment fluid used in the method is the well treatment fluid disclosed herein and described above.

For example, the well treatment fluid can be provided by: providing a base fluid; providing a plurality of degradable metal alloy milling waste particles; reducing the particle size of the degradable metal alloy milling waste particles to form a plurality of reduced-size degradable metal alloy milling waste particulates; and mixing the reduced-size degradable metal alloy milling waste particulates with the base fluid. The base fluid is the same as the base fluid described above.

For example, if the particulates formed by reducing the particle size of the degradable metal alloy milling waste particles have a spheroidal shape, the particulates can have a D50 particle size distribution in the range of from about 0.1 microns to about 10,000 microns and a maximum dimension to minimum dimension mean aspect ratio, for example, of 1:1 to 2:1. For example, if the particulates formed by reducing the particle size of the degradable metal alloy milling waste particles have a spheroidal shape, the particulates can have a D50 particle size distribution in the range of from about 0.1 microns to about 5,000 microns and a maximum dimension to minimum dimension mean aspect ratio, for example, of 1:1 to 2:1. For example, if the particulates formed by reducing the particle size of the degradable metal alloy milling waste particles have a spheroidal shape, the particulates can have a D50 particle size distribution in the range of from about 0.1 microns to about 2,000 microns and a maximum dimension to minimum dimension mean aspect ratio, for example, of 1:1 to 2:1. For example, if the particulates formed by reducing the particle size of the degradable metal alloy milling waste particles have a spheroidal shape, the particulates can have a D50 particle size distribution in the range of from about 1 micron to about 500 microns and a maximum dimension to minimum dimension mean aspect ratio, for example, of 1:1 to 2:1. For example, if the particulates formed by reducing the particle size of the degradable metal alloy milling waste particles have a spheroidal shape, the particulates can have a D50 particle size distribution in the range of from about 10 microns to about 100 microns and a maximum dimension to minimum dimension mean aspect ratio, for example, of 1:1 to 2:1.

For example, if the particulates formed by reducing the particle size of the degradable metal alloy milling waste particles are elongated particulates, the particulates can have a mean thickness in the range of from about 0.1 microns to about 100 microns, and a length to thickness mean aspect ratio of 1:1 to 10,000:1. For example, if the particulates formed by reducing the particle size of the degradable metal alloy milling waste particles are elongated particulates, the particulates can have a mean thickness in the range of from about 0.1 microns to about 100 microns, and a length to thickness mean aspect ratio of 50:1 to 1000:1. For example, if the particulates formed by reducing the particle size of the degradable metal alloy milling waste particles are elongated particulates, the particulates can have a mean thickness in the range of from about 0.1 microns to about 100 microns, and a length to thickness mean aspect ratio of 50:1 to 100:1. For example, if the particulates formed by reducing the particle size of the degradable metal alloy milling waste particles are elongated particulates, the particulates can have a mean thickness in the range of from about 0.1 microns to about 100 microns, and a length to thickness mean aspect ratio of 5:1 to 50:1. For example, if the particulates formed by reducing the particle size of the degradable metal alloy milling waste particles are elongated particulates, the particulates can have a mean thickness in the range of from about 0.1 microns to about 100 microns, and a length to thickness mean aspect ratio of 1:1 to 20:1.

A plurality of degradable metal alloy milling waste particles can be provided in a number of ways. For example, a plurality of degradable metal alloy waste particles can be purchased or obtained from any company or other source that obtains such particles as a byproduct resulting from milling a degradable metal work piece to obtain a degradable metal product having a desired shape. For example, a plurality of degradable metal alloy milling waste particles can be obtained from companies in the automobile and automobile parts manufacturing industry. A plurality of degradable metal alloy milling waste particles can also be obtained from companies in the oil and gas industry.

As another example, the method disclosed herein can further comprise milling a degradable metal alloy work piece to obtain a wellbore component and the degradable metal alloy milling waste particles. This allows the milling waste byproduct to be put directly to use in an effective and efficient manner.

The well treatment fluid can be introduced into the well, and the well treatment fluid can be allowed to treat the well in any manner known to those skilled in the art with the benefit of this disclosure. The milling waste particulates can be allowed to degrade over time by virtue of the wellbore conditions. Once the degradable metal alloy milling waste particulates have been allowed to degrade, they can be removed from the well (including the formation and/or wellbore). For example, the degraded milling waste particulates can be removed from the well by flowing back the well.

If desired, the reactivity of the degradable metal alloy milling waste particulates and the time it takes the particulates to degrade can be controlled. For example, this allows the degradable metal alloy milling waste particulates to be tailored to degrade at specific well conditions such as the temperature in the well.

For example, the method can be used in connection with drilling a well. The well treatment fluid can be a drilling fluid that is pumped into and circulated through the well. For example, the degradable metal alloy milling waste particulates can also function as a bridging agent in drilling fluids for various purposes including to control fluid loss.

For example, the well treatment fluid can be pumped through the wellbore and through one or more access conduits into the formation. As used herein and in the appended claims, an "access conduit" refers to a passageway that provides fluid communication between the wellbore and the subterranean formation, which may include, but is not limited to, sliding sleeves, open holes (for example, in non-cased areas), hydrajetted holes, perforations (for example, in cased areas), and the like. Access conduits can be formed in non-cased (open) areas and cased areas of the wellbore. The access conduits can extend through the casing wall (if present), cement used to hold the casing in place (if present) and the wellbore wall. It should be understood that the method disclosed herein is applicable to wellbores at any angle including, but not limited to, vertical wells, deviated wells, highly deviated wells, horizontal wells, and hybrid wells that comprise sections of any combination of the aforementioned wells. For example, the disclosed method may be used in connection with a subterranean formation and wellbore having an existing fracture network.

For example, the method disclosed herein can be used to hydraulically fracture a subterranean formation. The well treatment fluid can be used as the fracturing fluid. For example, the well treatment fluid can be pumped through the wellbore into the formation at a hydraulic pressure above the fracture gradient of the formation to form a fracture in the formation. For example, pumping the fracturing fluid into the formation at a pressure above the fracture gradient of the formation in accordance with the disclosed method can also form a fracture network in the formation that includes at least one primary fracture and at least one microfracture.

As used herein and in the appended claims, the fracture gradient of a formation means the minimum pressure required to create a new fracture or expand an existing fracture in some dimension in the formation. Forming a fracture in the formation means forming a new fracture or expanding an existing fracture in some dimension in the formation. For example, a pad fracturing fluid ("a pad fluid") that does not contain conventional proppant particulates can first be injected into the formation to initially fracture the formation. The pad fluid can be injected into the formation in multiple stages. Thereafter, a slurry including a base fluid and non-degradable proppant particulates (a "proppant slurry") can be injected into the formation. The proppant slurry places the proppant particulates in the fracture in order to prevent the fracture from fully closing once the hydraulic pressure created by the fluid is released and the fracturing operation is complete. The proppant slurry can also be injected into the formation in multiple stages.

The resulting propped fracture provides one or more conductive channels through which fluids in the formation can flow from the formation to the wellbore. For example, once the degradable metal alloy milling waste particulates are allowed to degrade and/or are removed from the fracture, a highly conductive propped fracture remains.

For example, the method disclosed herein can be used as a temporary flow barrier to divert a treatment fluid toward a desired area within a formation. For example, the well treatment fluid can be pumped through the wellbore into the formation in a manner that causes the degradable metal alloy milling waste particulates to divert the treatment fluid from one section of the formation to another section of the formation. For example, the well treatment fluid can be introduced into the wellbore (for example, through a tubing string therein) in a manner that causes the metal alloy milling waste particulates to seal off one or more openings in the wellbore or formation (for example, perforations in the wellbore wall or fluid flow paths into a fracture or formation) to block fluid flow therethrough. For example, the degradable metal alloy milling waste particulates can be used to form filter cakes on the surface of a formation face or proppant pack, thereby blocking the flow of fluid therethrough. As a result, the well treatment fluid or a new well treatment fluid is diverted into another area of the fracture or formation. The degradable metal alloy milling waste particulates have a structural integrity sufficient to withstand the fluid pressure. Once the operation is complete, the particulates can be allowed to degrade thereby restoring fluid flow through the sealed openings.

For example, the well treatment fluid and degradable metal alloy waste particulates thereof can be used in association with a fracturing operation to seal off perforations in the wellbore wall or the entrances of fractures in order to allow the fracturing fluid to divert and generate one or more new fractures. This is called near-wellbore diversion.

For example, the well treatment fluid and degradable metal alloy waste particulates thereof can also be used in association with a fracturing operation to seal off a created fracture deep in the formation in order to allow the fracturing fluid to divert and branch off to generate one or more additional fractures including primary fractures and/or microfractures and thereby enhance the size of the overall fracture network. This is called far-field diversion.

For example, in accordance with the method disclosed herein, the well treatment fluid can be introduced into the well in a manner that causes metal alloy milling waste particulates to seal off a first interval of the formation. In this example, the method then further comprises the step of after the well treatment fluid is introduced into the well in a manner that causes metal alloy milling waste particulates to seal off the first interval of the formation, pumping a stimulation fluid through the wellbore into a second interval of the formation to stimulate the second area of the formation.

For example, the well treatment fluid can further include a plurality of degradable metal alloy milling waste particulates and a plurality of non-degradable proppant particulates. The well treatment fluid can be introduced into the well in a manner that causes metal alloy milling waste particulates to seal off the first interval of the formation by pumping the well treatment fluid through the wellbore into the formation at a pressure above the fracture gradient of the formation to form a fracture in the formation, and placing degradable metal alloy milling waste particles and non-degradable proppant particulates from the well treatment fluid in the fracture in a manner that causes metal alloy milling waste particulates to seal off the first interval of said formation. Sealing off the first interval of the formation causes stimulation fluid pumped into the wellbore to divert to the second area of the formation in order to stimulate the second area of the formation.

The degradable metal alloy milling waste particulates and non-degradable proppant particulates can be placed in the fracture formed by the well stimulation fluid in the first interval of the formation in any manner known to those skilled in the art with the benefit of this disclosure. For example, the metal alloy milling waste particulates and non-degradable proppant particulates can be placed in the fracture formed by the well treatment fluid in the first interval of the formation by decreasing the rate at which the fracturing fluid is pumped into the formation to a level sufficient to allow the pressure at which the fracturing fluid is pumped to fall below the fracture gradient of the formation. Allowing the pressure at which the fracturing fluid is pumped to fall below the fracture gradient of the formation causes metal alloy milling waste particulates and non-degradable proppant particulates to be placed in and seal off the fracture.

For example, the stimulation fluid pumped into the second interval of the formation can also be pumped through the wellbore into the formation at a pressure above the fracture gradient of the formation to form a fracture in the second interval in the formation. For example, the stimulation fluid pumped into the second interval of the formation can also include a plurality of degradable metal alloy milling waste particulates and a plurality of non-degradable proppant particulates that are placed in the fracture in the second interval in a manner that causes metal alloy milling waste particulates to seal off the second interval of said formation as set forth above. Sealing off the second interval of the formation causes the stimulation fluid pumped into the wellbore to divert to a third area of the formation.

For example, the well treatment fluid used to seal off the first interval of the formation can also be the stimulation fluid pumped into the second interval of the formation to fracture and seal off the second interval of the formation and the same treatment fluid used to fracture or otherwise stimulate a third interval of the formation. The rate at which the well treatment fluid is pumped into the formation is controlled to decrease and increase the hydraulic pressure provided by the well treatment below and above the fracture gradient of the formation as necessary. The number of formation intervals on which this process can be carried out is not limited.

In accordance with this disclosure, one component (for example, a particle or fluid) can be added to or mixed with another component (for example, a particle or fluid) in any manner known to those skilled in the art with the benefit of this disclosure. For example, one or more components can be added to or mixed with one or more other components at the well site including on the fly as the components are pumped into the wellbore.

The degradable metal alloy milling waste particulates included in the well treatment fluid and/or stimulation fluid are the same as the degradable metal alloy milling waste particulates described above. Once the degradable metal alloy milling waste particulates are mixed with the base fluid, the well treatment fluid or stimulation fluid becomes the well treatment fluid disclosed above. The non-degradable proppant particulates can also be the same as the non-degradable proppant particulates described above.

Once the operation is complete, pumping of the stimulation fluid into the well and formation can be ceased, which causes the pressure at which the well treatment fluid or stimulation fluid is pumped into the formation to fall below the fracture gradient of the formation. Once this occurs, the fractures tend to close on top of non-degradable proppant particulates in the fractures.

The degradable metal alloy milling waste particulates can then be allowed to degrade as set forth above. If necessary, the degraded particles can be removed from the fractures, formation and wellbore by, for example, flowing back the well.

Once the degradable metal alloy milling waste particulates are allowed to degrade, the non-degradable proppant particulates continue to hold the fractures open thereby maintaining the ability of fluid to flow through the fractures to the wellbore. The areas in the fractures where the degradable alloy milling waste particulates were initially placed tend to remain open thereby increasing the conductivity of the fracture. The conductive channels formed by the operation allow hydrocarbons to flow through the fracture to the wellbore and ultimately to the surface where they can be recovered.

As another example, the method disclosed herein can further comprise: providing a proppant slurry; intermittently pumping the proppant slurry and the well treatment fluid disclosed herein through the wellbore into the formation at a pressure above the fracture gradient of the formation to form a fracture in the formation, placing non-degradable proppant particulates of the proppant slurry and degradable metal milling alloy waste particulates of the well treatment fluid in the fracture in a manner such that degradable metal milling alloy waste particulates surround proppant particulates in the fracture; ceasing pumping of the proppant slurry and the well treatment fluid into the formation thereby causing the pressure at which the proppant slurry and well treatment fluid are pumped into the formation to fall below the fracture gradient of the formation; and allowing the degradable metal alloy milling waste particulates in the fracture to degrade.

As used herein and in the appended claims, a proppant slurry means a slurry comprising a base fluid as described above, and a plurality of non-degradable proppant particulates as described above. The proppant slurry and well treatment fluid can be intermittently pumped through the wellbore into the formation at a pressure above the fracture gradient of the formation to form a fracture in the formation, and non-degradable proppant particulates of the proppant slurry and degradable metal milling alloy waste particulates of the well treatment fluid can be placed in the fracture in a manner such that degradable metal milling alloy waste particulates surround proppant particulates in the fracture in any manner known to those skilled in the art with the benefit of this disclosure.

Ceasing pumping of the proppant slurry and well treatment fluid into the formation in accordance with the disclosed method causes the pressure at which the proppant slurry and well treatment fluid are pumped into the formation to fall below the fracture gradient of the formation. Once this occurs, the fracture tends to close on top of non-degradable proppant particulates in the fracture. The non-degradable proppant particulates prevent the fracture from being completely closed. The degradable metal alloy milling waste particulates in the fracture can be allowed to degrade as set forth above, and the degraded particulates and spacer fluid can be removed from the fracture, for example, by flowing back the well. This results in the formation of proppant-free channels that connect the reservoir with the wellbore.

Once the degradable metal alloy milling waste particulates are allowed to degrade, the non-degradable proppant particulates continue to hold the fracture open thereby maintaining the ability for fluid to flow through the fracture to the wellbore. The areas in the fracture where the degradable alloy milling waste particulates were initially placed tend to remain open thereby increasing the conductivity of the fracture. The conductive channels formed by the fracturing operation allow hydrocarbons to flow through the fracture to the wellbore and ultimately to the surface where they can be recovered.

Examples of Disclosed Well Treatment Fluid and Method

For example, the disclosed well treatment fluid can comprise an aqueous base fluid, a plurality of degradable metal alloy milling waste particulates, and a plurality of additional degradable particulates that break down and at least partially deteriorate in less than 20 days in a downhole environment.

For example, the disclosed well treatment fluid can comprise an aqueous base fluid, a plurality of degradable metal alloy milling waste particulates, and a plurality of non-degradable high crush resistant particulates.

For example, the disclosed well treatment fluid can comprise an aqueous base fluid, a plurality of degradable metal alloy milling waste particulates, and a plurality of non-degradable proppant particulates.

For example, the method disclosed herein can comprise providing the well treatment fluid disclosed herein, introducing the well treatment fluid into a tubing string in the wellbore in a manner that causes the metal alloy milling waste particulates to seal off one or more openings in the wellbore or formation, and allowing the milling waste particulates to degrade. As used in this example, the well treatment fluid is provided by providing a base fluid, providing a plurality of degradable metal alloy milling waste particles, reducing the particle size of degradable metal alloy milling waste particles to form a plurality of reduced size particulates, and mixing the metal alloy milling waste particulates with the base fluid.

For example, the method disclosed herein can comprise providing the well treatment fluid disclosed herein, introducing the well treatment fluid into a tubing string in the wellbore in a manner that causes the metal alloy milling waste particulates to seal off one or more openings in the wellbore or formation, and allowing the milling waste particulates to degrade. As used in this example, the well treatment fluid is provided by providing a base fluid, providing a plurality of degradable metal alloy milling waste particles by milling a degradable metal alloy work piece to obtain a wellbore component and the degradable metal alloy milling waste particles, reducing the particle size of degradable metal alloy milling waste particles to form a plurality of reduced size particulates, and mixing the metal alloy milling waste particulates with the base fluid.

For example, the method disclosed herein can comprise providing the well treatment fluid disclosed herein, pumping the well treatment fluid through the wellbore into the formation at a hydraulic pressure above the fracture gradient of the formation to form a fracture in the formation, and allowing the milling waste particulates to degrade. As used in this example, the well treatment fluid is provided by providing a base fluid, providing a plurality of degradable metal alloy milling waste particles, reducing the particle size of degradable metal alloy milling waste particles to form a plurality of reduced size particulates, and mixing the metal alloy milling waste particulates with the base fluid.

For example, the method disclosed herein can comprise providing the well treatment fluid disclosed herein, pumping the well treatment fluid through the wellbore into the formation at a hydraulic pressure above the fracture gradient of the formation to form a fracture in the formation, and allowing the milling waste particulates to degrade. As used in this example, the well treatment fluid is provided by providing a base fluid, providing a plurality of degradable metal alloy milling waste particles by milling a degradable metal alloy work piece to obtain a wellbore component and the degradable metal alloy milling waste particles, reducing the particle size of degradable metal alloy milling waste particles to form a plurality of reduced size particulates, and mixing the metal alloy milling waste particulates with the base fluid.

For example, the method disclosed herein can comprise providing the well treatment fluid disclosed herein, pumping the well treatment fluid through the wellbore into the formation in a manner that causes the degradable metal milling waste particulates to divert the treatment fluid from one section of the formation to another section of the formation, and allowing the milling waste particulates to degrade. As used in this example, the well treatment fluid is provided by providing a base fluid, providing a plurality of degradable metal alloy milling waste particles, reducing the particle size of degradable metal alloy milling waste particles to form a plurality of reduced size particulates, and mixing the metal alloy milling waste particulates with the base fluid.

For example, the method disclosed herein can comprise providing the well treatment fluid disclosed herein, pumping the well treatment fluid through the wellbore into the formation in a manner that causes the degradable metal milling waste particulates to divert the treatment fluid from one section of the formation to another section of the formation, and allowing the milling waste particulates to degrade. As used in this example, the well treatment fluid is provided by providing a base fluid, providing a plurality of degradable metal alloy milling waste particles by milling a degradable metal alloy work piece to obtain a wellbore component and the degradable metal alloy milling waste particles, reducing the particle size of degradable metal alloy milling waste particles to form a plurality of reduced size particulates microns, and mixing the metal alloy milling waste particulates with the base fluid.

For example, the method disclosed herein can comprise providing the well treatment fluid disclosed herein, introducing the well treatment fluid into the well in a manner that causes metal alloy milling waste particulates to seal off a first interval of the formation, after said well treatment fluid is introduced into said well in a manner that causes metal alloy milling waste particulates to seal off a first interval of the formation, pumping a stimulation fluid through the wellbore into a second interval of the formation to stimulate the second area of the formation, and allowing metal alloy milling waste particulates that are sealing off the first interval of the formation to degrade. As used in this example, the well treatment fluid is provided by providing a base fluid, providing a plurality of degradable metal alloy milling waste particles, reducing the particle size of degradable metal alloy milling waste particles to form a plurality of reduced size particulates, and mixing the metal alloy milling waste particulates with the base fluid.

For example, the method disclosed herein can comprise providing the well treatment fluid disclosed herein, introducing the well treatment fluid into the well in a manner that causes metal alloy milling waste particulates to seal off a first interval of the formation, after said well treatment fluid is introduced into said well in a manner that causes metal alloy milling waste particulates to seal off a first interval of the formation, pumping a stimulation fluid through the wellbore into a second interval of the formation to stimulate the second area of the formation, and allowing metal alloy milling waste particulates that are sealing off the first interval of the formation to degrade. As used in this example, the well treatment fluid is provided by providing a base fluid, providing a plurality of degradable metal alloy milling waste particles by milling a degradable metal alloy work piece to obtain a wellbore component and the degradable metal alloy milling waste particles, reducing the particle size of degradable metal alloy milling waste particles to form a plurality of reduced size particulates, and mixing the metal alloy milling waste particulates with the base fluid.

Figure 2:
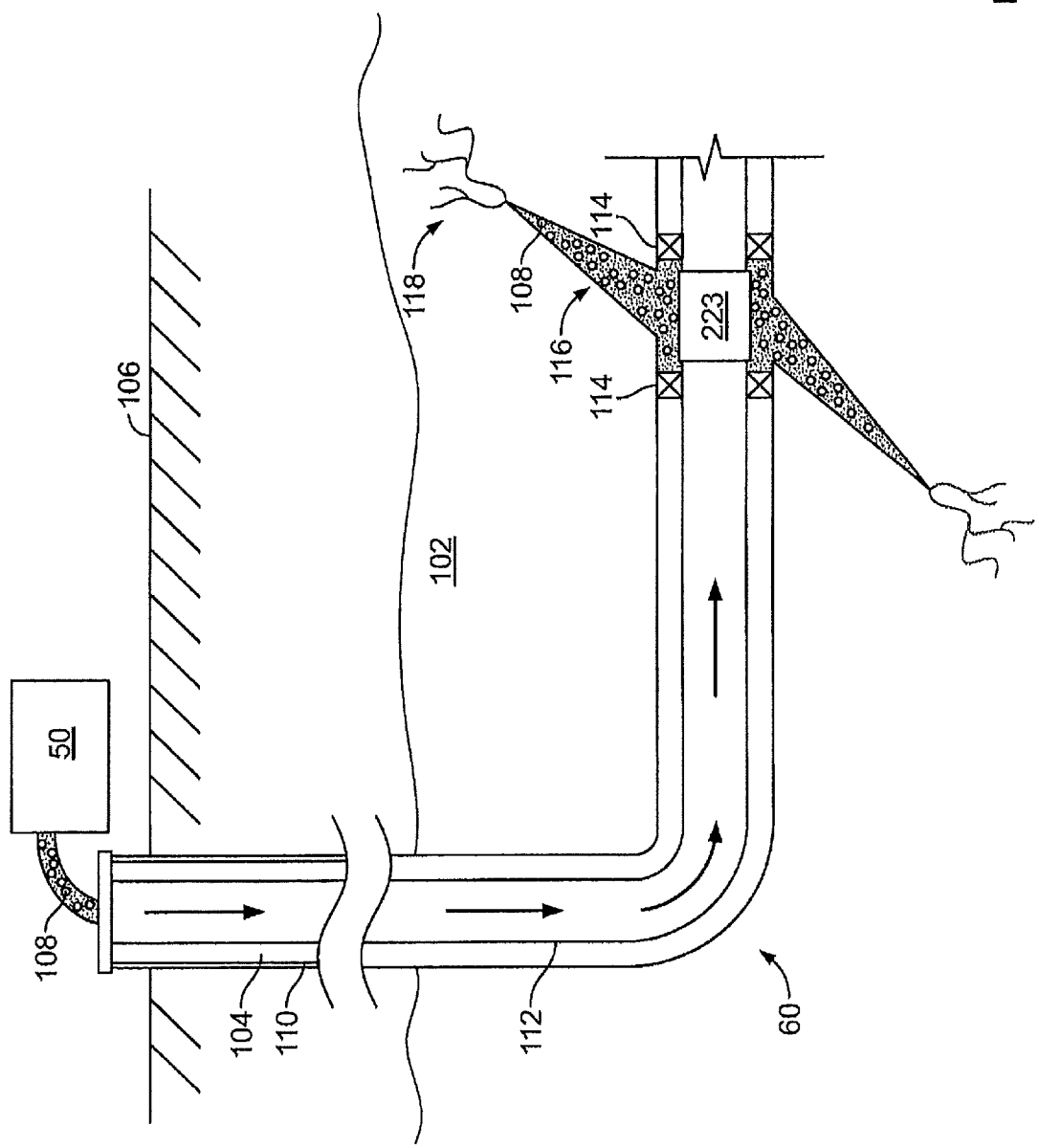
FIG. 2 is a diagram illustrating an example of a subterranean formation in which a fracturing operation can be performed in accordance with certain embodiments of the present disclosure.

The exemplary fluids, compositions and methods disclosed herein may directly or indirectly affect one or more components or pieces of equipment associated with the preparation, delivery, recapture, recycling, reuse, and/or disposal of the disclosed fluids, compositions and methods. FIGS. 1 and 2 illustrate a typical fracturing operation.

For example, and with reference to FIG. 1, the disclosed fluids, compositions and methods may directly or indirectly affect one or more components or pieces of equipment associated with an exemplary fracturing system 10, according to one or more embodiments. In certain instances, the system 10 includes a fracturing fluid producing apparatus 20 (for example, for producing a pad fracturing fluid and/or proppant slurry for use in the disclosed method), a fluid source 30, a proppant source 40, and a pump and blender system 50. The system 10 resides at the surface at a well site where a well 60 is located. For example, the fracturing fluid producing apparatus 20 can combine a gel precursor with fluid (e.g., liquid or substantially liquid) from fluid source 30, to produce a hydrated fracturing fluid (for example, the pad fluid and/or proppant slurry of the method disclosed herein) that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, as discussed above, the fracturing fluid may comprise water, a hydrocarbon fluid, a polymer gel, foam, air, wet gases and/or other fluids.

The proppant source 40 can include and provide the proppant (including the micro-proppant particulates and primary proppant particulates of the disclosed method) for combination with the fracturing fluid (for example, the pad fluid and proppant slurry) as appropriate. The system may also include an additive source 70 that can provide the degradable metal alloy milling waste particulates of the disclosed well treatment fluid and one or more additives (e.g., gelling agents, weighting agents, and/or other optional additives as discussed above) to alter the properties of the fracturing fluid (for example, the pad fluid and/or proppant slurry). For example, additives from the additive source 70 can be included to reduce pumping friction, to reduce or eliminate the fluid's reaction to the geological formation in which the well is formed, to operate as surfactants, and/or to serve other functions.

For example, the pump and blender system 50 can receive the fracturing fluid (for example, the base carrier fluid) and combine it with other components, including proppant particulates from the proppant source 40 and/or additional fluid and other additives from the additive source 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, proppant source 40 and/or additive source 70 may be equipped with one or more metering devices (not shown) to control the flow of fluids, degradable metal alloy milling waste particulates, proppant particulates, and/or other compositions to the pump and blender system 50. Such metering devices may permit the pump and blender system 50 to source from one, some or all of the different sources at a given time, and may facilitate the preparation of fracturing fluids in accordance with the present disclosure using continuous mixing or "on the fly" methods. Thus, for example, the pump and blender system 50 can provide just fracturing fluid (for example, the pad fluid) into the well at some times, just proppant slurry at some times, just proppant particulates at other times, and combinations of those components at yet other times.

FIG. 2 shows the well 60 during a fracturing operation in a portion of a subterranean formation of interest 102 (for example, a subterranean zone) surrounding a wellbore 104. For example, the formation of interest can include one or more subterranean formations or a portion of a subterranean formation.

The wellbore 104 extends from the surface 106, and the fracturing fluid 108 (for example, the pad fluid and proppant slurry) is applied to a portion of the subterranean formation 102 surrounding the horizontal portion of the wellbore. Although shown as vertical deviating to horizontal, the wellbore 104 may include horizontal, vertical, slant, curved, and other types of wellbore geometries and orientations, and the fracturing treatment may be applied to a subterranean zone surrounding any portion of the wellbore. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro jetting and/or other tools.

The well is shown with a work string 112 depending from the surface 106 into the wellbore 104. The pump and blender system 50 is coupled to a work string 112 to pump the fracturing fluid 108 into the wellbore 104. The work string 112 may include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean zone 102. For example, the work string 112 may include ports adjacent the wellbore wall to communicate the fracturing fluid 108 directly into the subterranean formation 102, and/or the work string 112 may include ports that are spaced apart from the wellbore wall to communicate the fracturing fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the fracturing fluid 108 will be pumped. FIG. 4 shows two packers 114, one defining an uphole boundary of the interval and one defining the downhole end of the interval.

When the fracturing fluid 108 (for example, the pad fracturing fluid) is introduced into wellbore 104 (e.g., in FIG. 4, the area of the wellbore 104 between packers 114) at a sufficient hydraulic pressure, one or more primary fractures 116 and microfractures 118 are created in the subterranean zone 102. As shown, the microfractures have propagated from or near the ends and edges of the primary fractures 116. The primary proppant particulates in the fracturing fluid 108 (for example, the proppant slurry) enter the fractures 116 where they may remain after the fracturing fluid flows out of the wellbore, as described above. These primary proppant particulates may "prop" fractures 116 such that fluids may flow more freely through the fractures 116. Similarly, the micro-proppant particulates in the fracturing fluid 108 (for example, the pad fluid and the proppant slurry) enter the fractures 118 where they may remain after the fracturing fluid flows out of the wellbore, as described above. The primary proppant particulates and micro-proppant particulates "prop" fractures 116 and 118, respectively, such that fluids may flow more freely through the fractures 116 and 118.

While not specifically illustrated herein, the disclosed fluids, compositions and methods may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Therefore, the present compositions and methods are well adapted to attain the ends and advantages mentioned, as well as those that are inherent therein. The particular examples disclosed above are illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a well, comprising:
   providing a well treatment fluid, said well treatment fluid including:
      a base fluid; and
      a plurality of degradable metal alloy milling waste particulates, wherein said degradable metal alloy milling waste particles are provided by milling a degradable metal alloy work piece to obtain a wellbore component and said degradable metal alloy milling waste particles;
   introducing said well treatment fluid into said well and allowing said well treatment fluid to treat the well; and
   allowing said degradable metal alloy milling waste particulates to degrade.

2. The method of claim 1, wherein said well treatment fluid is provided by:
   providing a base fluid;
   providing a plurality of degradable metal alloy milling waste particles;
   reducing the particle size of degradable metal alloy milling waste particles to form a plurality of reduced-size degradable metal alloy milling waste particulates; and
   mixing said reduced-size degradable metal alloy milling waste particulates with said base fluid.

3. The method of claim 1 whereby said well treatment fluid is introduced into said well by pumping said well treatment fluid through a wellbore into a formation at a hydraulic pressure above the fracture gradient of the formation to form a fracture in the formation.

4. The method of claim 1 whereby said well treatment fluid is introduced into said well by pumping said well treatment fluid through a wellbore into a formation in a manner that causes the degradable metal alloy milling waste particulates to divert the treatment fluid from one section of the formation to another section of the formation.

5. The method of claim 1 whereby said well treatment fluid is introduced into said well in a manner that causes said metal alloy milling waste particulates to seal off one or more openings in a wellbore or formation.

6. The method of claim 1, wherein:
   said well treatment fluid is introduced into said well in a manner that causes degradable metal alloy milling waste particulates to seal off a first interval of a formation; and
   said method further comprises after said well treatment fluid is introduced into said well in a manner that causes metal alloy milling waste particulates to seal off a first interval of the formation, pumping a stimulation fluid through a wellbore into a second interval of the formation to stimulate said second interval of the formation.

7. The method of claim 6, wherein:
   said well treatment fluid further includes a plurality of degradable metal alloy milling waste particulates and a plurality of non-degradable proppant particulates; and
   said well treatment fluid is introduced into said well in a manner that causes the degradable metal alloy milling waste particulates to seal off said first interval of the formation by:
      pumping said well treatment fluid through the wellbore into the formation at a pressure above the fracture gradient of the formation to form a fracture in the formation; and
      placing degradable metal alloy milling waste particles and non-degradable proppant particulates from said well treatment fluid in said fracture in a manner that causes metal alloy milling waste particulates to seal off said first interval of said formation.

8. The method of claim 1, further comprising:
   providing a proppant slurry;
   intermittently pumping said proppant slurry and said well treatment fluid through a wellbore into a formation at a pressure above the fracture gradient of the formation to form a fracture in the formation and placing non-degradable proppant particulates of said proppant slurry and degradable metal milling alloy waste particulates of said well treatment fluid in said fracture in a manner such that degradable metal milling alloy waste particulates surround proppant particulates in said fracture;

ceasing pumping of said proppant slurry and said well treatment fluid into said formation thereby causing the pressure at which the proppant slurry and well treatment fluid are pumped into the formation to fall below the fracture gradient of the formation; and allowing said degradable metal alloy milling waste particulates in said fracture to degrade.

9. A method of treating a well, comprising:

providing a well treatment fluid, said well treatment fluid being provided by:
   providing a base fluid;
   providing a plurality of degradable metal alloy milling waste particles, wherein said degradable metal alloy milling waste particles are provided by milling a degradable metal alloy work piece to obtain a wellbore component and said degradable metal alloy milling waste particles;
   reducing the particle size of degradable metal alloy milling waste particles to form a plurality of reduced-size degradable metal alloy milling waste particulates;
   mixing said reduced-size degradable metal alloy milling waste particulates with said base fluid to form said well treatment fluid;

introducing said well treatment fluid into the well in a manner that causes metal alloy milling waste particulates to seal off a first interval of a formation;

pumping a stimulation fluid through a wellbore into a second interval of the formation to stimulate said second interval of the formation; and allowing metal alloy milling waste particulates that are sealing off said first interval of the formation to degrade.

10. The method of claim 9, wherein said reduced-size degradable metal alloy milling waste particulates are mixed with said base fluid to form said well treatment fluid using mixing equipment.

11. The method of claim 9, wherein said well treatment fluid is introduced into the well in a manner that causes metal alloy milling waste particulates to seal off a first interval of the formation using one or more pumps.

* * * * *